(No Model.) 5 Sheets—Sheet 1.

R. E. BREED.
MACHINE FOR MAKING HOES.

No. 280,287. Patented June 26, 1883.

Attest:
F. H. Schott
A. R. Brown

Inventor:
Richard E. Breed
by J. C. Tasker atty (No Model.)

R. E. BREED.
MACHINE FOR MAKING HOES.

No. 280,287. Patented June 26, 1883.

Attest:
F. H. Schott
A. R. Brown

Inventor:
Richard E. Breed

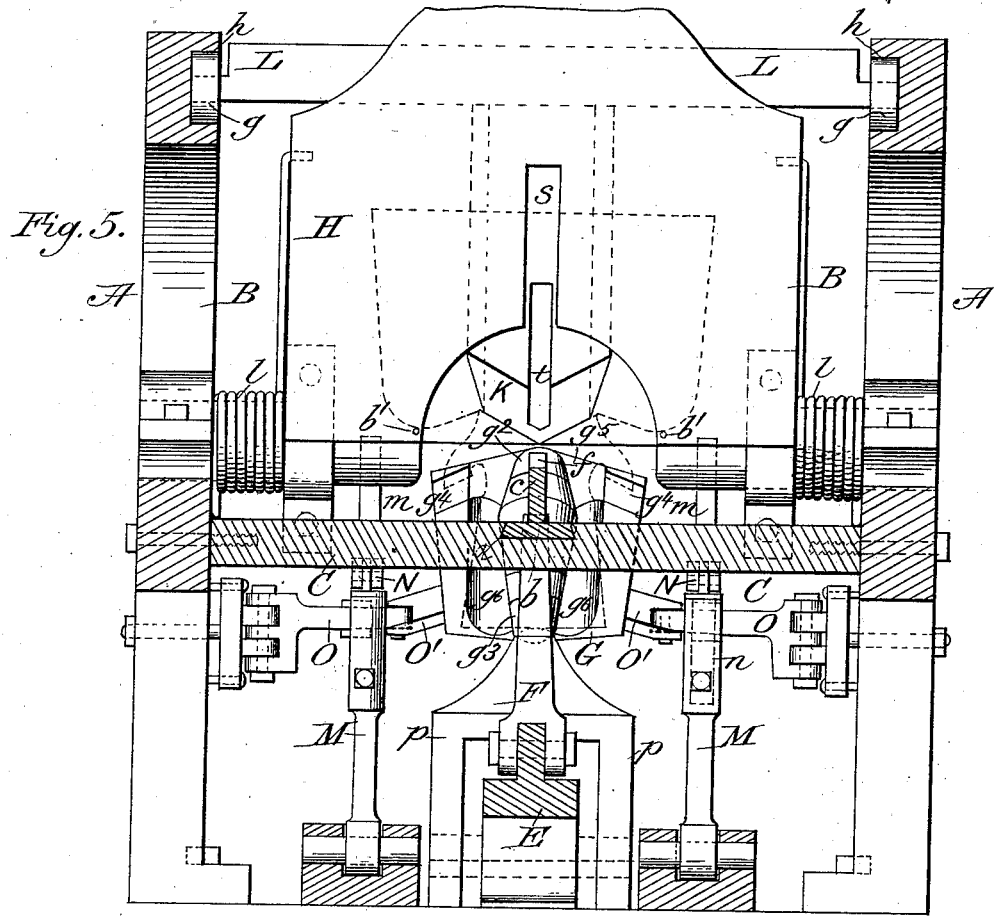
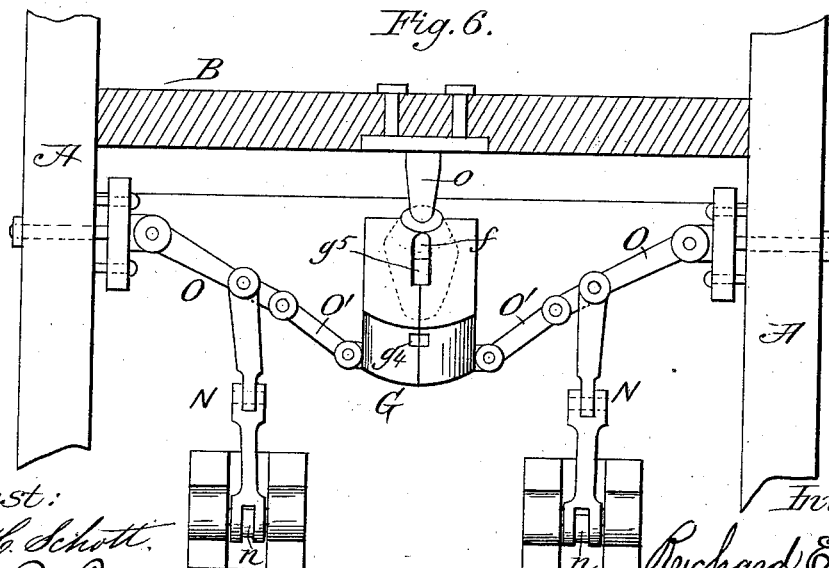

(No Model.) 5 Sheets—Sheet 4.
R. E. BREED.
MACHINE FOR MAKING HOES.
No. 280,287. Patented June 26, 1883.
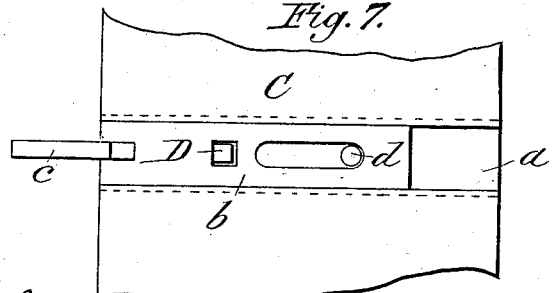
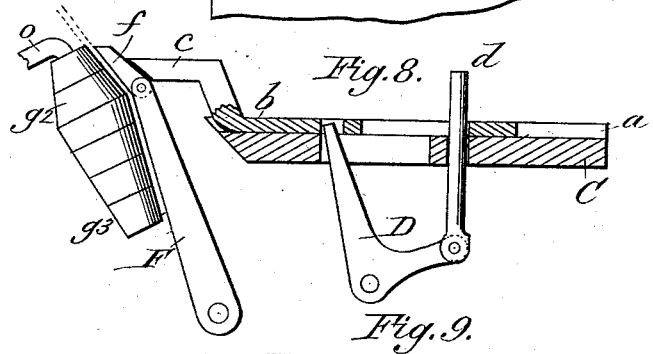
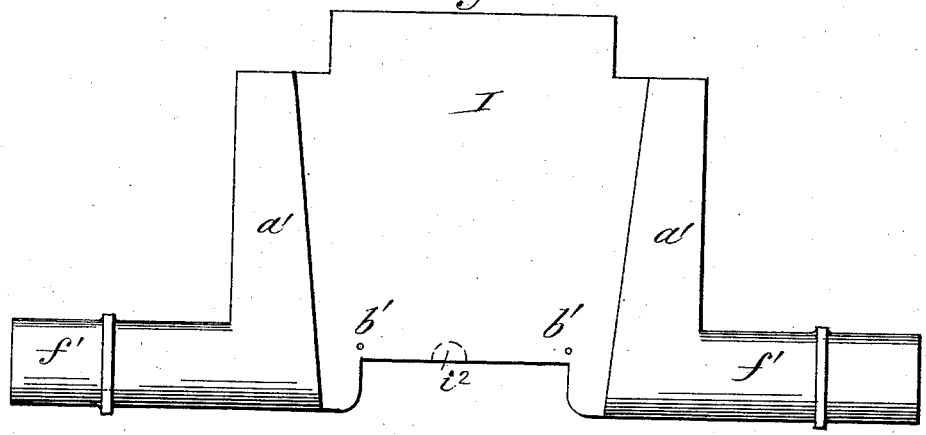
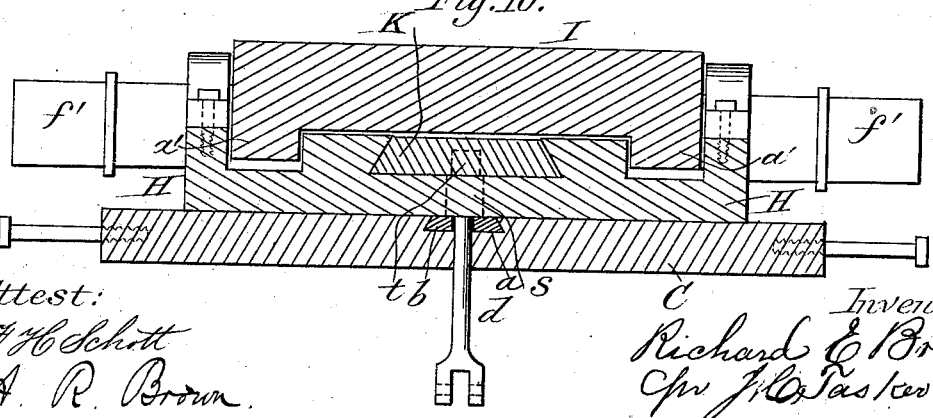
Attest:
F. H. Schott
A. R. Brown
Inventor:
Richard E. Breed (No Model.) 5 Sheets—Sheet 5.

R. E. BREED.
MACHINE FOR MAKING HOES.

No. 280,287. Patented June 26, 1883.

Attest:
H. H. Schott
A. R. Brown

Inventor:
Richard E. Breed
per J. C. Taskerwatty

UNITED STATES PATENT OFFICE.

RICHARD E. BREED, OF PITTSBURG, PENNSYLVANIA.

MACHINE FOR MAKING HOES.

SPECIFICATION forming part of Letters Patent No. 280,287, dated June 26, 1883.

Application filed February 8, 1883. (No model.)

*To all whom it may concern:*

Be it known that I, RICHARD E. BREED, a citizen of the United States, residing at Pittsburg, in the county of Allegheny and State of Pennsylvania, have invented certain new and useful Improvements in Machines for Making Hoes; and I do hereby declare the following to be a full, clear, and exact description of the invention, such as will enable others skilled in the art to which it appertains to make and use the same.

This invention relates to machines for giving the required form to a hoe or other analogous article at one operation after the blank from which it is to be formed has been cut to the proper shape.

The invention relates more particularly to a machine for forming hoes of that class in which the blade, together with its tang, shank, or handle-socket, is struck up from a single piece of sheet metal.

Figure 1:
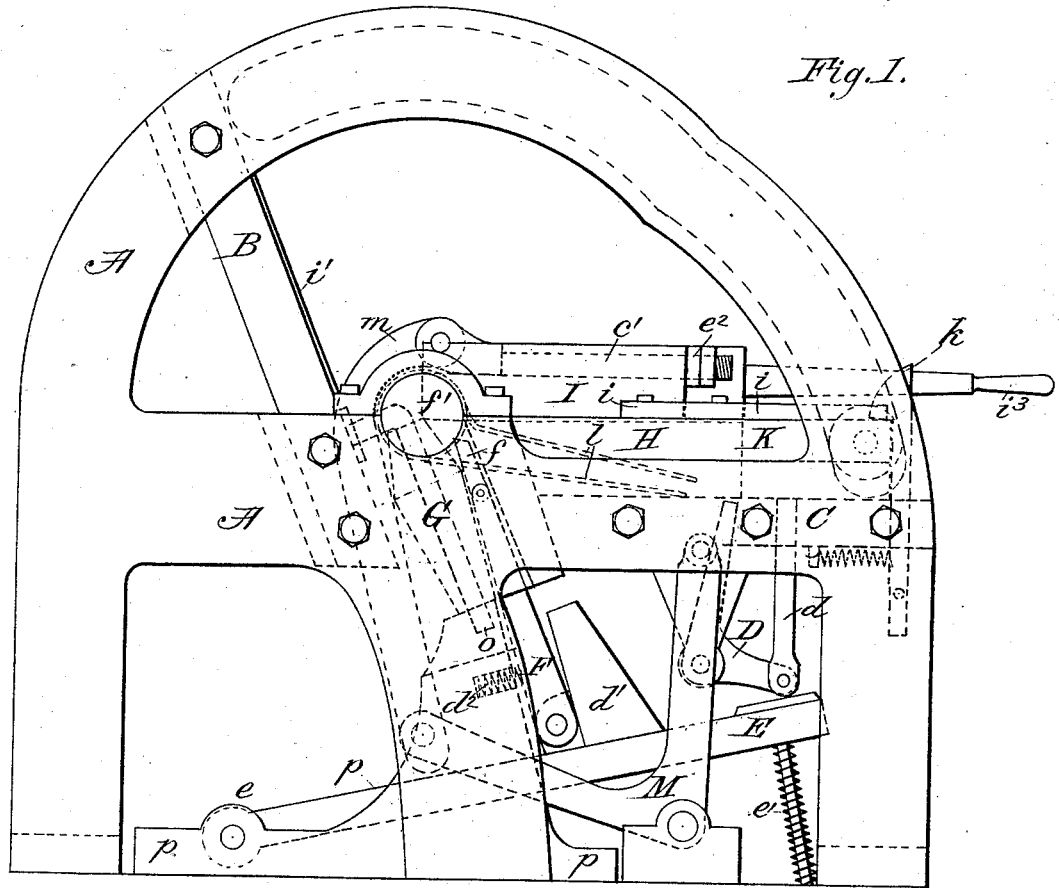
Figure 2:
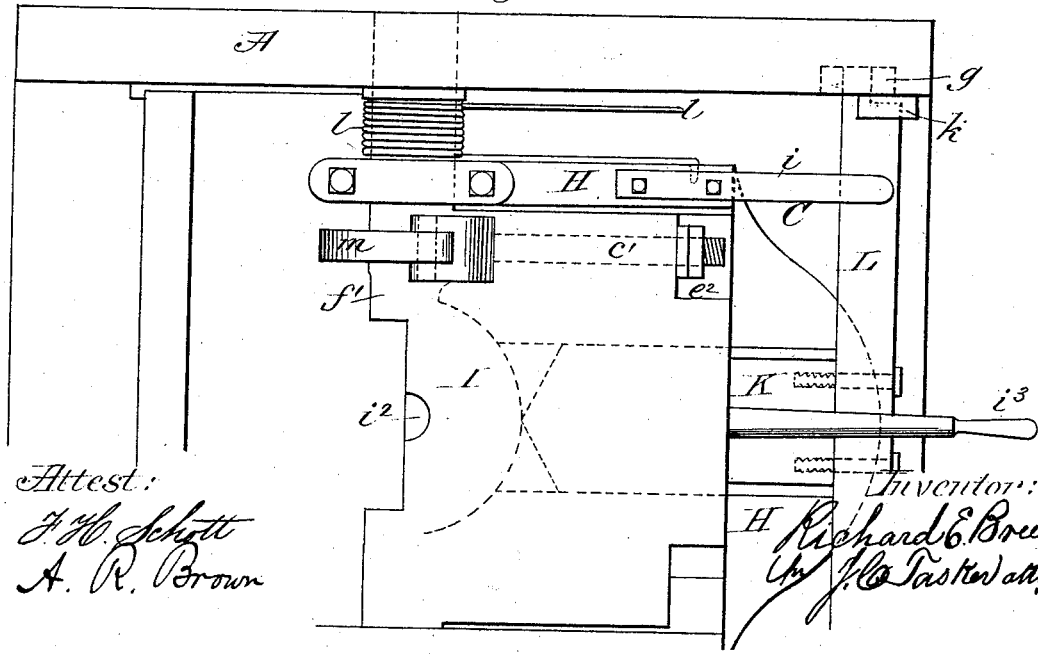
Figure 3:
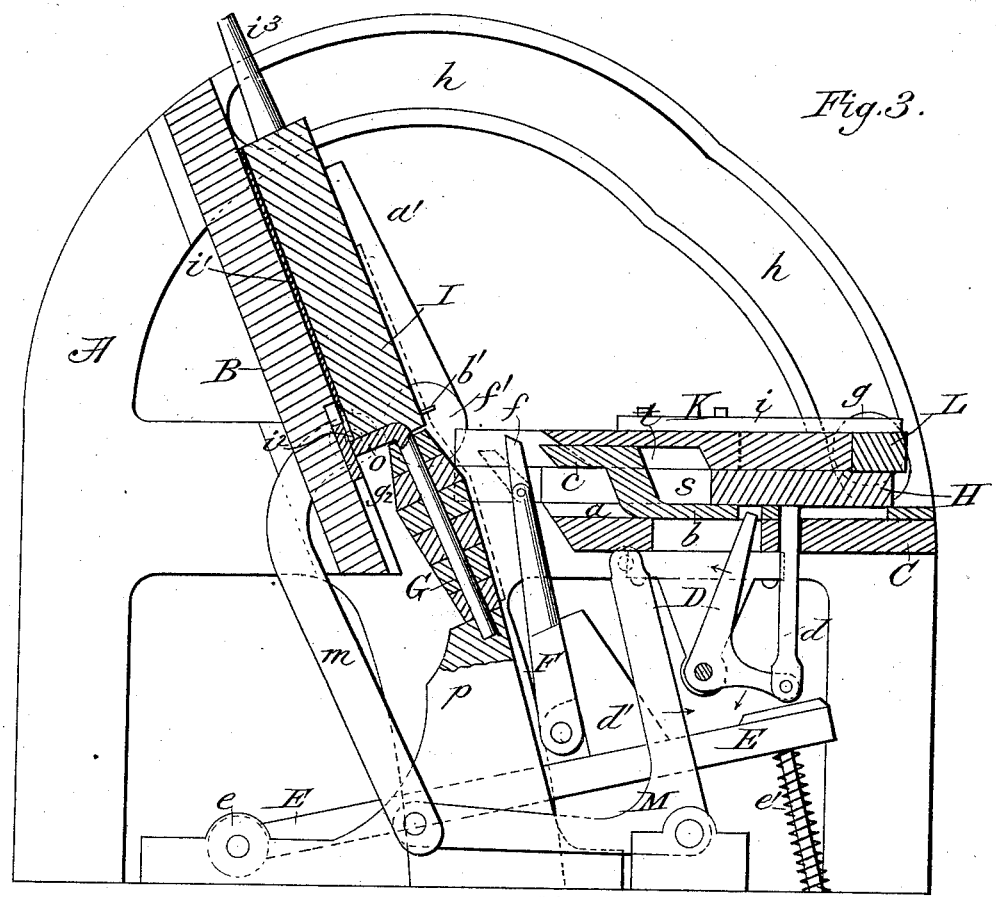
Figure 4:
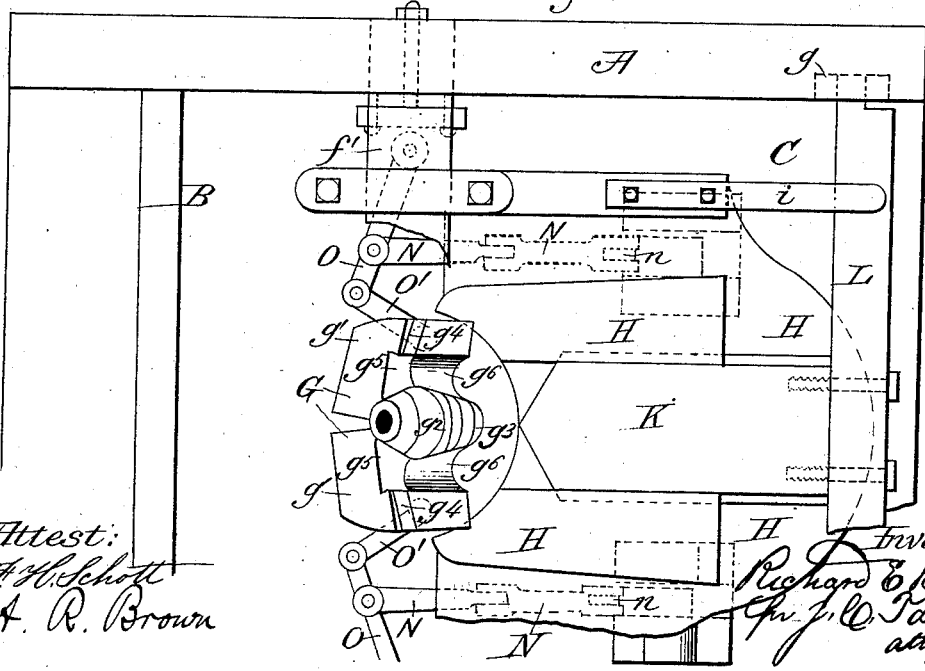
Figure 11:
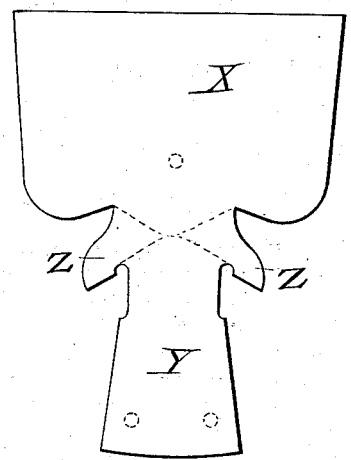
Figure 12:
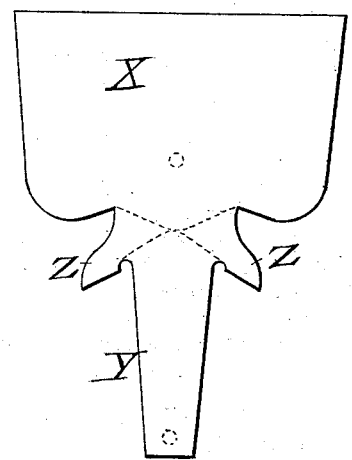
Figure 13:
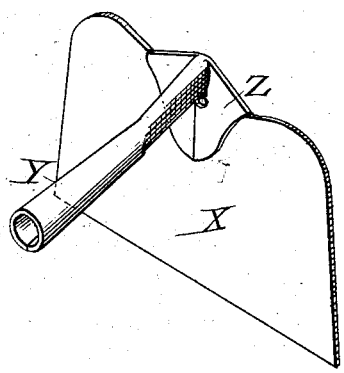
Figure 14:
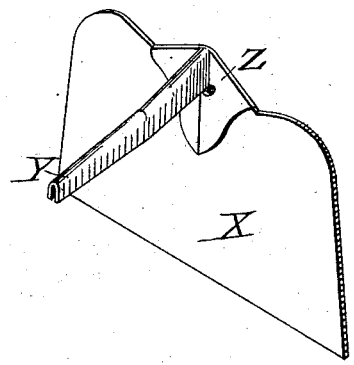
Figure 15:
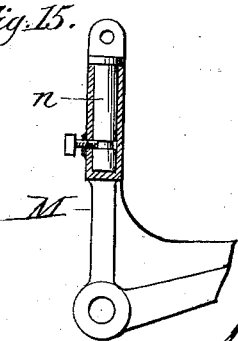

In the annexed drawings, illustrating the invention, Figure 1 is a side elevation of my improved machine for forming hoes and other analogous articles. Fig. 2 is a partial plan view of the machine as shown in Fig. 1. Fig. 3 is a side elevation of the machine, partly in section. Fig. 4 is a plan view with the mandrel and trunnioned plate removed. Fig. 5 is a transverse section of the machine, with the trunnioned plate and slide-frame thrown back. Fig. 6 is a partial plan view and horizontal section, showing the folder with its connections and operating mechanism, the trunnioned plate and slide-frame being removed. Fig. 7 is a plan view of the plunger. Fig. 8 is a longitudinal sectional elevation of the plunger and its connections, showing its relation to the mandrel and folder. Fig. 9 is a plan view of the trunnioned plate. Fig. 10 is a transverse section of the trunnioned plate, slide-frame, and former folded onto the table. Fig. 11 represents a blank from which a socket-hoe is to be formed. Fig. 12 represents a blank for forming a shank or tang hoe. Fig. 13 is a perspective view of a socket-hoe. Fig. 14 is a perspective view of a shank-hoe. Fig. 15 is a sectional detail illustrating the socketed arm of a bell-crank with swiveled connection.

Like letters indicate like parts.

In the machine illustrated in the drawings the frame-work comprises the side pieces, A A, which support an inclined back piece, B, and a slotted table, C, the latter being arranged at the front end of the machine. The table C is provided centrally with a longitudinal slotted guideway, *a*, having inwardly-beveled sides, and in this guideway is arranged a slide, *b*, provided with a plunger end, *c*, which is preferably formed in one piece with said slide. The slide *b* is slotted longitudinally for passage around the upper projecting end of a rod, *d*, which passes through an opening formed in the guideway *a* of the table C, and is connected at its lower end to one arm of a bell-crank, D, that is pivoted in suitable hangers beneath the table, the upper end of the other arm of said bell-crank being engaged in an opening formed in the slide *b*, and being adapted to actuate the plunger-slide in its back-and-forth movements.

A bar, E, pivoted at *e* and supported by a spring, *e'*, or its equivalent, is arranged in an oblique or inclined position beneath the table and bears upward against the short arm of the bell-crank D, thereby causing the long arm of the bell-crank to force the slide toward the mandrel F, the said slide and attached plunger having been previously carried in the opposite direction by the contact of the slide-frame H with the rod *d*, attached to the short arm of said bell-crank. The bar E carries a hinged mandrel, F, that is arranged in a vertically-inclined position in front of the folder G, and is within the same when closed, and carries an articulated extension, *f*, at its end. The folder G is adapted to fold the shank or tang of the hoe or other like article around the mandrel F, and is operated by a system of toggles and levers, that will be hereinafter more fully explained.

A slide-frame, H, and a trunnioned plate, I, are pivoted coincidently, so as to have a common center of motion. This slide-frame H is provided with a guideway for the reception of a sliding former, K, one end of which is securely attached to or formed with a cross-piece, L, the ends of which carry friction-rollers *g*, that travel in camways or tracks *h*, formed in the inner faces of the side pieces, A A. On each side of the pivoted slide-frame is an extension or arm, *i*, that projects over the cross-piece L, thus serving to lessen the strain. The slide-frame H is held down when required by means of a spring-latch, k, or other suitable fastening. The sliding former K is pointed and beveled at one end, as shown in Figs. 3, 4, and 5, for the purpose of bearing on the hoe-blank at the proper points or lines of demarkation for folding the tang and ears of the same. It is obvious that the shape given to the end of the former or slide K may be varied according to the formation of the blank or shape that is to be given to the hoe or analogous article formed from said blank. The slide-frame H may be provided with springs $l$ $l$ for throwing the slide-frame back when released, or this slide-frame may be operated by power applied in any convenient manner. The trunnioned plate I is adapted to act in connection with the slide-frame H as a clamping device for holding the blade of the hoe or other article while the tang or shank of such article is being formed on the mandrel F by means of the folder G, as hereinafter more fully described, the trunnioned plate and slide-frame, which are coincidently pivoted, being caused to turn upon their common pivots by means of power applied in any suitable manner. It will be observed that the former K, though nearly flush with its guideways that are formed on the slide-frame, is slightly reduced in thickness, so that, while serving as a part of the clamping device for holding the blade of the article, it may be readily withdrawn at the proper time without liability of binding on said blade. The trunnioned plate I is provided on each side with a curved connecting rod or bar, $m$, the lower end of which is pivoted to one end of a bell-crank lever, M, the upper end of which is socketed and provided with a swiveled connection, $n$, for the attachment of the bifurcated end of a jointed connection, N, that is pivoted to one arm, O, of a toggle-joint, the other arm, O', of the toggle being pivoted to the folder G, so as to be capable of actuating the same.

What is here denominated the "folder" G is simply a pair of hinged dies that are journaled on a rod, $o$, the lower end of which is secured in a suitable support, $p$, arranged above and around the bar E, said support being so arranged as to allow the necessary movements of the said bar. The upper end of the rod $o$ is so curved or bent as to be capable of being seing secured in the back plate B, as shown in Figs. 1, 3, and 6. The leaves or wings $g'$ $g'$ of the folder G are grooved or concaved longitudinally to correspond with the form of the mandrel F, which they inclose when forming the shank or socket of the article operated upon. The joints or knuckles $g^2$ $g^2$ are so formed as to give the requisite "set," "kink," or "crook" to the shank or socket, the upper two or more knuckles increasing in diameter from their upper to their lower edges, while the remaining knuckles diminish in size from above downward. The lower joint or knuckle, $g^3$, or that farthest from the trunnioned plate, is disconnected from the leaves of the folder, and is preferably arranged as a tight collar on the rod $o$, so as not to rotate with the leaves $g'$ and knuckles $g^2$, thus obviating any liability of displacing the metal being operated upon and enabling it to be held firmly. In the upper part of each leaf or die $g'$, and opening into the outer edge of the same, is a groove or recess, $g^4$, that coincides with a similar recess in the opposite leaf, thus forming an opening for the sliding mandrel $c$ when the folder is closed. The inner ends of the recesses $g^4$ open into recesses $g^5$ $g^5$, that are formed for the reception of the articulated extension $f$ of the mandrel F, the body of which mandrel rests in the concave portions $g^6$ $g^6$ of the leaves when the folder is closed. It will be understood that the form of the knuckles $g^2$, as above described, may be varied according to the set, kink, or crook to be imparted to the shank or socket, and they will therefore be made of varying or of uniform size as required.

The mandrel F is hinged or pivoted to the bar E at the back of and in contact with a post or lug, $d'$, that is rigidly secured to said bar E, and serves to hold the mandrel and socket firmly against the knuckles of the folder while the shank is being formed. After the shank or socket has been formed, the trunnioned plate I, whose downward movement had folded the blade of the article, and at the same time closed the folder G over the socket on the mandrel F, is thrown back, thus opening the folder G and releasing the mandrel F, which is then thrown forward against the lug $d'$ by the tension of a spring, $d^2$, and is now in position for the article to be removed. While the socket is being formed the articulated extension $f$ of the hinged mandrel F is held firmly back toward the upper knuckles of the folder and within the blade end of the socket, which is pressed back against the upper knuckles by means of the plunger $c$, that enters the folder through the opening $g^4$, thus giving the requisite kink or crook to the blade end of the socket. If the socket is to be formed either straight or tapered, but without the usual kink, the sliding plunger $c$, as well as the articulation of the extension $f$, may be dispensed with, and the knuckles of the folder will be made uniform in size and of the same diameter throughout. The form of the mandrel F and folder G will be varied according to the shape of the shank or socket to be made, a cylindrical or tapering mandrel being used with a concaved folder and a flat mandrel with a folder having plane surfaces. The hoe or analogous article may thus be provided with a cylindrical socket or with a flat shank, as desired, and with but a slight change in the form of the folder and mandrel.

A toggle-bar, O', is pivoted to the outer face of each leaf of the folder G, and connects with a toggle-bar, O, that has an adjustable connection with some rigid portion of the side frame of the machine. These toggles are connected to the upper ends of the bell-cranks M M by means of jointed connections N N, as before described. The upper ends of the bell-cranks being socketed and provided with swiveled connections n n for the attachment of the bars N N, the latter are thus capable of universal motion. When the trunnioned plate I is thrown back, the rods m m, acting upon the bell-cranks M M, operate the toggles O O' through the connections N N, and thus open the folder G for the removal of the completed article or the introduction of a fresh blank, and when the trunnioned plate is thrown down the bars m m draw on the bell-cranks M and connections N, so as to extend or spread the toggles, and thus close the folder around the mandrel.

The trunnioned plate I may be arranged to rotate on a shaft or on trunnions supported in the frame of the machine; but it is preferably formed in one piece with its trunnions, which may be made to extend beyond the plate a sufficient distance for the application thereto of steam or other power. This trunnioned plate is provided on its under side or face with guides $a'$ $a'$ and with pins $b'$ $b'$, that prevent lateral displacement of the hoe-blade or other similar article and hold it at the proper elevation for the formation of the shank or socket. For the purpose of adjusting the connection of the bars or rods m m, so as to take up wear and insure an efficient action of the folder G, said bars or levers m m, instead of being pivoted directly to the trunnioned plate, are connected to the bifurcated ends of rods $c'$ $c'$, that are passed through the trunnioned plate on each side, as shown in Figs. 1 and 2, the other ends of said rods being screw-threaded and provided with nuts $e^2$ $e^2$, that may be tightened or loosened at pleasure.

The slide-frame H, as before mentioned, is pivoted on the same center of motion with the trunnioned plate, preferably on the trunnions $f'$ $f'$, the said trunnioned plate and slide-frame thus forming a clamp or holder for the blade of the article operated upon.

Having described the construction of the devices comprised in my machine for forming or bending metallic hoe-blanks, I will now proceed to explain its method of operation in forming a hoe of the character illustrated in Fig. 13 or Fig. 14 from a blank such as shown in Fig. 11 or Fig. 12.

The several parts of the machine being in the position shown in Fig. 3, with the trunnioned plate I lying against the back plate, B, and the slide-frame H held down by the latch $k$, or its equivalent, a blank of the requisite shape or outline having been heated, if deemed advisable, to a proper degree, is laid with its blade portion X against the trunnioned plate and with its shank portion Y into the folder G and behind the mandrel F. The slide-frame H is then released and is caused to fold back and close upon the blank under the action of the springs $l$ $l$ or of power applied in any convenient manner. Power is now applied to the trunnioned plate I, so as to carry it, together with the slide-frame H, forward and down upon the table C, the folder G being at the same time closed through its operating mechanism, which is connected with the trunnioned plate, as before described. It will be observed that when the clamping devices of the hoe-blade are thrown back in the position shown in Fig. 5 the sliding former K is at its farthest inward throw, and is in position to bear on the blank and determine the line of fold between the blade X and the wings Z Z.

The construction of the camways $h$ $h$, in which the rollers $g$ $g$ move, is such—each being composed of two curves struck from different centers, one of which centers is coincident with the trunnions $f'$ $f'$—that, as the trunnioned plate I and slide-frame H fold forward and down, the former K, connected to the roller cross-bar L, remains in the position above indicated until its withdrawal becomes necessary. While the rollers $g$ $g$ remain in that portion of each camway which is concentric with the center on which the trunnioned plate and slide-frame swing, the former K simply swings with them, and the ears Z Z are folded toward the beveled surfaces of said former. Before the swinging movement of the former K brings it into a horizontal line with the upper surface of the folder G, in position to interfere with the perfect folding of the ears, the rollers $g$ $g$ have respectively passed into that portion of each camway which is eccentric to the point on which the trunnion-plate and slide-frame swing, and the sliding former K is thereby withdrawn in season to permit the ears Z Z to fold closely against the blade X, the doubled surfaces being thus brought between the trunnioned plate and upper surface of the folder, which parts act together as a die in pressing the ears firmly against the blade of the article. Meanwhile by the action of the closing folder G the socket Y has been closely folded around the mandrel F, and is completely formed by the time the frame H touches the rod $d$. The movement of the slide-frame and trunnioned plate being continued, the rod $d$ is pressed down, carrying with it the short arm of the bell-crank D and depressing the forward end of the bar E, thereby withdrawing the plunger $c$ and drawing the mandrel F down a short distance within the folder. The forward and downward movement of the trunnioned plate and slide-frame being now completed, the latter, when it comes in contact with the table C, is caught and held by the spring-latch $k$ or other suitable fastening. In order to release the finished article and introduce a fresh blank, the slide-frame H being still held by its fastening, the trunnioned plate I is thrown back, thereby opening the folder G through the toggles and connecting mechanism. When the folder G is opened, the mandrel F, being relieved from pressure, is thrown forward by the tension of its spring $d^2$ into position to permit the blade and its attached socket to be removed and a fresh blank inserted. After a fresh blank is thus inserted against the trunnioned plate, with its shank projecting into the folder, as before described, the slide-frame will be released so as to close on the blade, and the operation as above described will be repeated.

For the purpose of obviating jar and deadening the force of the blow with which the slide-frame comes against the trunnioned plate, the back plate, B, is provided with a cushion, $i'$, of wood or other suitable material, as shown in Fig. 3. The back of the trunnioned plate I is recessed at $i^2$ to fit over the curved upper end of the rod $o$ when the plate is thrown back, and the slots or recesses $s$ and $t$, Figs. 3 and 5, in the under faces of the slide-frame H and former K, respectively, are for the purpose of allowing said parts to fold down onto the table C without interfering with the operation of the plunger $c$ in its back-and-forth movements. If desired, the trunnioned plate I may be provided with a handle, $i^3$, by which it may be actuated, or which may be used as a starter when other than hand-power is applied for the purpose of actuating the machine.

It is obvious that the relative arrangement of various parts of the machine may be varied and the construction of certain devices be modified without affecting the principle of operation. For example, the table C, which is represented in a horizontal position, may be arranged obliquely; and the back plate, B, and folder G, instead of being inclined, may be placed in a vertical or a horizontal position, or at any desired angle to the table. In forming a hoe or other analogous article with a straight shank or socket, without the kink or crook sometimes deemed desirable, the mandrel F may be formed without the articulated extension F, or, in other words, said extension may be made rigid; and the plunger $c$ and attached parts may also be dispensed with, the rod $d$, or its equivalent, being then connected to the bar E, which supports and actuates the mandrel.

It is also apparent that the trunnioned plate may be attached to any suitable frame or standard and made to remain stationary, while what is now represented as the frame of the machine, together with the slide-frame, sliding former, and the shank-folding devices, may be made to swing.

Having thus described my invention, what I claim as new, and desire to secure by Letters Patent, is—

1. In a machine for making hoes, the combination, with a clamp for holding and bending the hoe-blade, of a folding device composed of two corresponding portions or dies having a hinged connection and adapted to form the shank or socket of the hoe, substantially as described.

2. In a machine for making a shank or socket hoe from a single blank, the combination, with a socket or shank folder composed of two folding parts hinged to a fixed pin, of a swinging clamp for holding the blade of the hoe and folding it to the proper angle with its shank or socket, substantially as described.

3. In a machine for making a shank or socket hoe from a single blank, the combination, with a mandrel and a socket or shank folder composed of two folding parts hinged to a fixed pin, of a swinging clamp for holding the hoe-blade and folding it over to meet its shank or socket, substantially as described.

4. In a machine for making a shank or socket hoe from a single blank, a clamping device composed of two parts having a hinged connection, one of said parts being provided with a sliding former adapted to determine the lines upon which the blank is to be folded, substantially as described.

5. In a machine for making a shank or socket hoe from a single blank, the combination, with a clamping device comprising a swinging frame having a sliding former provided with a pointed and beveled end, of a movable mandrel and a shank or socket folder adapted to be closed around said mandrel, substantially as described.

6. In a machine for making a shank or socket hoe from a single blank, the combination, with a clamping device composed of two parts having a hinged connection, of a sliding former supported in one of said parts, and means for actuating said former, substantially as described.

7. In a machine for making a shank or socket hoe from a single blank, the combination of a swinging clamping and bending device adapted to hold a hoe-blade, a sliding former capable of swinging with said clamping device, a folder and a mandrel for forming the hoe shank or socket, and suitable operating mechanism, substantially as described.

8. In a machine for making a shank or socket hoe from a single blank, the combination of a swinging clamping device for holding the hoe-blade, a former adapted to have a swinging and sliding movement, a movable mandrel, and a folding device for forming a shank or socket, said folding device being also adapted to act in conjunction with a portion of the clamping device as a die for folding down the ears of the hoe upon its blade, substantially as described.

9. In a machine for making a shank or socket hoe from a single blank, the combination of a clamping device for holding the blade of a hoe-blank, a sliding former adapted to determine the lines of bend, a mandrel, and a folding device adapted to be closed around said mandrel, substantially as described.

10. In a machine for making a shank or socket hoe from a single blank, the combination of a clamping device, one part of which has suitable guides, a sliding former adapted to be moved along the surface of said part, a movable mandrel, and a folding device adapted to be closed around said mandrel, for the purpose of forming the shank or socket of the article, substantially as described.

11. In a machine for making a shank or socket hoe from a single blank, the combination, with a clamping device composed of a trunnioned plate and a slide-frame swinging on a common center of motion and adapted to hold the blade of the article to be formed, of a movable mandrel and shank-folding mechanism, substantially as described.

12. The combination, with a folding device for forming the shank or socket of a hoe, of a movable mandrel having an articulated extension, and a plunger adapted to enter the folder and bear on said extension, for the purpose of forming the shank or socket with the requisite set or crook, substantially as described.

13. The combination of a slotted table, a slide carrying a plunger, a folding device adapted to clamp the blade of a hoe, a folder adapted to form the shank or socket of such article, and having an opening near its upper end for the reception of the plunger, a hinged and jointed mandrel carried by a pivoted bar, and connecting and operating mechanism, substantially as described.

14. The combination, with a folding device adapted to form the shank or socket of a hoe-blank, of a movable mandrel, a plunger, and actuating mechanism, substantially as described.

15. The combination, with a folder adapted to close around a mandrel having an articulated end, of a plunger entering an opening in said folder and adapted to bear on the said articulated end of the mandrel so as to hold it back against one side of said folder, substantially as described.

16. The combination, with a movable mandrel and a folder adapted to close around the same, of a slide carrying a plunger, a movable rod, and a bell-crank, having one arm connected to the slide and the other arm connected to said rod, whereby the plunger is actuated, substantially as described.

17. The combination, with a socket or shank folding device, of a mandrel hinged to a pivoted bar and provided with an articulated extension, substantially as described.

18. The shank or socket folder G, composed of two portions, $g'$ $g'$, having a hinged connection, and provided with knuckles $g^2$ $g^3$, of uniform or varying size, substantially as described.

19. The combination, with the folder G, of the mandrel F, hinged to a pivoted bar, E, and provided with an articulated extension, $f$, substantially as described.

20. The combination of the folder G, the pivoted bar E, having lug $d'$, and the mandrel F, hinged to said bar, substantially as described.

21. The combination of the folder G, trunnioned plate I, and means for actuating said folder from the trunnioned plate, substantially as described.

22. The combination of the folder G, trunnioned plate I, slide-frame H, sliding former K, and mandrel F, substantially as described.

23. The combination, with the trunnioned plate I and slide-frame H, of the sliding former K, cross-bar L, carrying rollers $g\,g$, and the camways $h\,h$, said camways being each formed of two curves, one of which is concentric with the point on which the trunnioned plate and slide-frame swing, the other curve being eccentric to said point, whereby the sliding former while swinging with the slide-frame is withdrawn and returned at the proper time, substantially as described.

24. The combination, with the trunnioned plate I and slide-frame H, of the springs $l\,l$, substantially as described.

25. The combination, with the trunnioned plate I and the folder G, of the connecting-rods $m\,m$, bell-cranks M M, toggles O O', and connections N N, substantially as described.

26. The combination, with the folder G, pivoted bar E, and mandrel F, having articulated extension $f$, of the slide $b$, carrying plunger $c$, the bell-crank D, and the rod $d$, substantially as described.

27. The folder G, composed of two corresponding leaves provided with joints or knuckles $g^2$ $g^2$, journaled on a rod or hinge-pin, $o$, having a tight collar, $g^3$, arranged to form one of the knuckles of said folder, substantially as described.

28. The combination, with the slide-frame H, sliding former K, and folder G, of the trunnioned plate I, having guides $a'$ $a'$ and pins $b'$ $b'$, substantially as described.

29. The combination, with the trunnioned plate I and folder G, of the rods $m\,m$, toggles O O', bell-cranks M M, having swiveled ends $n\,n$, and the jointed connections N N, substantially as described.

30. The combination of the trunnioned plate I and slide-frame H, pivoted on a common center, the sliding former K, adapted to swing with the trunnioned plate and slide-frame, and having a cross-bar, L, carrying rollers $g\,g$, engaging in camways $h\,h$, the mandrel F, hinged to a pivoted bar, E, the folder G, adapted to close around said mandrel, means for connecting the trunnioned plate I and folder G, and means by which to actuate the trunnioned plate and slide-frame, substantially as described.

In testimony whereof I affix my signature in presence of two witnesses.

RICHARD E. BREED.

Witnesses:
 A. R. BROWN,
 PHILIP MAURO.